United States Patent

[11] 3,614,377

| [72] | Inventors | James B. Stearns |
| | | Elm Grove; |
| | | Robert W. Wendelburg, Milwaukee, both of Wis. |
| [21] | Appl. No. | 819,238 |
| [22] | Filed | Apr. 25, 1969 |
| [45] | Patented | Oct. 19, 1971 |
| [73] | Assignee | Chemetron Corporation Chicago, Ill. |

[54] ARC WELDING SUPPLY HAVING MULTIPLE CONTROL SYSTEM
9 Claims, 2 Drawing Figs.

[52] U.S. Cl. .................................................... 219/131 R, 219/130
[51] Int. Cl. .................................................... B23k 9/10
[50] Field of Search .................................................... 219/131, 132, 130; 315/320, 321, 322

[56] References Cited
UNITED STATES PATENTS

| 3,324,379 | 6/1967 | Mulder | 219/131 X |
| 3,337,769 | 8/1967 | Buchanan | 315/205 X |
| 3,371,242 | 2/1968 | Aldenhoff et al. | 315/205 X |
| 3,475,585 | 10/1969 | Pierce | 219/131 |
| 3,497,769 | 2/1970 | Stearns | 219/131 X |

Primary Examiner—J. V. Truhe
Assistant Examiner—George A. Montanye
Attorney—James E. Nilles ABSTRACT: An arc welding supply having a three-phase transformer and a full-wave rectifier including a plurality of controlled rectifiers. A feedback control system is provided for controlling the firing of the controlled rectifiers. The feedback control system includes a first adjustable potentiometer means connected to establish a first output voltage and current and a second adjustable potentiometer means connected in parallel with the first adjustable potentiometer means to establish a different setting for the output characteristic. A relay control circuit energized from the triggers of a pair of torches are connected to selectively insert only one of the potentiometer means into the feedback control system.

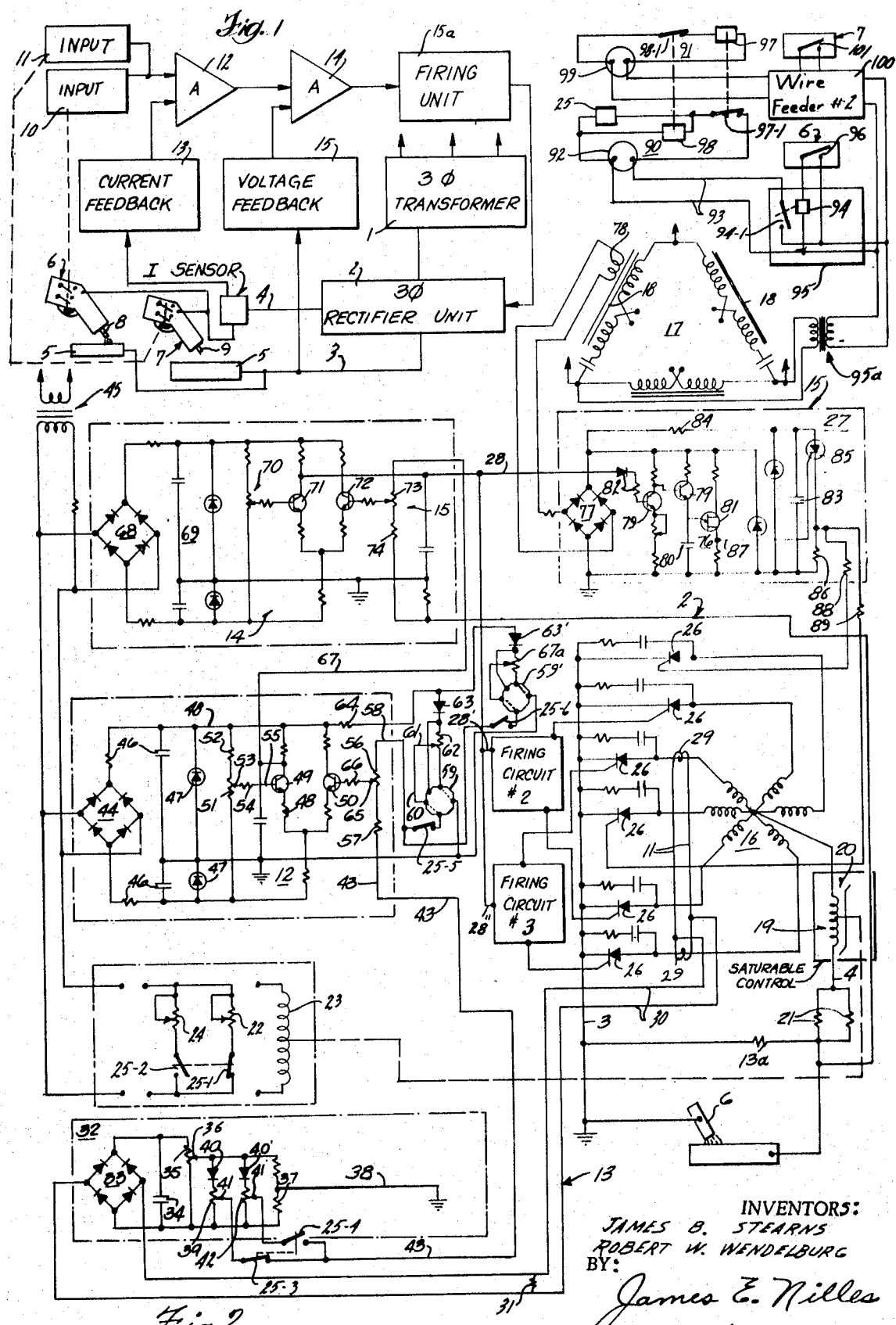

ARC WELDING SUPPLY HAVING MULTIPLE CONTROL SYSTEM

BACKGROUND OF THE INVENTION

This invention relates to an arc welding power supply having a multiple control system for controlling the output voltage.

Direct current power supplies for establishing and maintaining an arc between a pair of electrodes such as a welding arc may employ a motor generator or a transformer-rectifier to establish the proper voltage. Transformer-rectifier units have recently been developed employing triggered solid state elements such as silicon controlled rectifiers. An unusually satisfactory welding power supply of the above characters is disclosed in U.S. Pat. No. 3,337,769 to J. Buchanan and an improved system is disclosed in applicant's copending application entitled "Direct Current Arc Power Supply with Stabilized Feedback Control," now U.S. Pat. No. 3,549,978, which was filed on the same day as this application and is assigned to the same assignee. The firing of the controlled rectifiers in the latter application includes an adjustable current feedback amplifier to control the slope characteristics and connected as an input to a separate voltage feedback amplifier, the output of which maintains a desired constant output voltage. An adjustable, saturable inductor is preferably connected in the arc circuit to further control the arc characteristic, particularly for short arc and spray arc type welding.

In certain arc welding applications, a given machine may advantageously be employed in a plurality of different welding applications. For example, twin-wire-feeding drive systems are available for dual application welding. Generally, the machine or apparatus includes a pair of distinctly separate welding guns or torches which are interconnected to two different wire sources, but interconnected to a single welding machine. The operator independently sets the voltage, slope and inductance controls for each welding application. This, of course, is relatively time consuming, particularly where a remote control system is being employed and the machine with the basic controls is at some location remote from the welding work.

SUMMARY OF THE INVENTION

This present invention is particularly directed to an improved arc welding power supply or the like having a plurality of individual adjustable control means selectively interconnected to the power control circuit to permit complete independent presetting of voltage, slope, inductance and the like for selectively establishing of entirely different welding power without readjusting the machine proper. The present invention is particularly useful in the dual welding applications and is hereinafter described in a dual control system. The individual adjustable control means are interconnected to the control circuit through an interlocking circuitry to insure that the wrong power setting is not applied to other than the desired torch or gun.

In a particular novel aspect of the present invention, a torch trigger means responds to the operation of a torch for actuating of the interlocking control. Thus, when the operator picks up a torch and actuates it, he automatically insures the selection of the proper preset adjustable control means for that torch. A control relay means may be employed, defining electrically actuated switches, having normally closed contacts and normally open contacts respectively connecting the adjustable control means in the power circuit. The one torch includes a selection switch interconnected to provide power to the control relay means to actuate it and reverse the position of the contacts. This then, reverses the normal circuit connection of the adjustable control means. An interlocking relay is similarly powered from such selection switch to positively insure disconnect of the other selection switch circuit controlled by the opposite torch. The second selection switch circuit would similarly include an interlock relay controlled by a selection switch in the related torch. When the latter torch is operated, the control relay means is maintained in the normal position, thus inserting the desired adjustable control means. The second selection switch however, actuates the related interlock relay to open the circuit to the first interlock relay and the control relay means and therefore, positively prevent operation thereof.

In a practical construction employing a remote control concept, a separate plug-in type connector can be employed for automatically selecting the proper setting whenever a given torch is actuated. Further, power for the selection switch circuits is derived from the corresponding torch.

BRIEF DESCRIPTION OF THE DRAWINGS

FIG. 1 is a block diagram of the power supply and control circuitry for an arc welding system constructed in accordance with the present invention; and FIG. 2 is a schematic circuit diagram illustrating the preferred construction of the present invention shown in FIG. 1.

DESCRIPTION OF A PREFERRED EMBODIMENT

Referring to the drawing and particularly to FIG. 1, the illustrated embodiment of the invention includes a polyphase welding transformer 1 providing an alternating current input to a full wave polyphase rectifier unit 2. A pair of output leads 3 and 4 are connected to the rectifier with the lead 3 shown as a positive lead and the lead 4 shown as a negative lead. In the illustrated embodiment of the invention, the positive lead 3 is connected to a pair of separate work members 5 and the negative lead 4 is connected to a pair of torches 6 and 7 each having a related electrode or wire 8 and 9. When the power supply is connected to a torch 6 or 7, an arc is established and maintained between the corresponding electrode and the work member, shown between electrode 8 of torch 6 and works for purposes of explanation. The voltage across the electrode 8 and the work member 5 is preset and maintained at an essentially constant arc voltage and characteristic. For a different characteristic, the torch 7 may be used. In the illustrated embodiment of the invention, a pair of reference voltage inputs 10 and 11 are connected in parallel to one side of a current feedback summing amplifier 12. The second input of the amplifier 12 is connected via a current feedback unit 13 connected to establish a signal proportional to the current through load line 4. The output of the summing amplifier 12 is connected as a first input to a voltage feedback summing amplifier 14. The second input of the amplifier 14 is connected to a voltage feedback network 15. The output of the amplifier 14 is therefore, a modified voltage signal related to the slope characteristic established by the current feedback and in turn modified by the desired constant voltage characteristics. The output of the amplifier 14 is connected to a firing unit 15a which is adapted and interconnected to the rectifier unit 2 to produce properly timed spaced firing pulses to the bank of triggered rectifiers, which are subsequently described. The inputs 10 and 11 are coupled respectively to torches 6 and 7, as shown by the dotted coupling lines and may be set, along with other controls shown in FIG. 2, to differently fire the rectifier network 2 to establish and maintain different power supplies across the related arc.

A preferred construction of one embodiment of the circuitry is shown in FIG. 2.

Referring particularly to FIG. 2, the transformer 1 is illustrated as a three-phase transformer having a six-phase star secondary 16 and coupled to a three-phase delta-connected primary 17. The windings of the primary and secondary are suitably coupled on a common core 18 to establish a constant potential transformer for establishing a similar output at the leads 3 and 4.

The common or star point of the secondary 16 is connected in series with a load winding 19 of a saturable reactor control unit 20 and a pair of paralleled slope control resistors 21 to the work 5. The saturable reactor control unit 20 provides variable inductance in series with the welding arc, particularly for short arc welding characteristics.

The saturable inductance control is connected to a suitable adjustable DC power supply and preferably as shown in applicants' copending application Ser. No. 819,334, entitled, "Direct Current Power Supply with Adjustable Inductance Control" which was filed on the same day as the present application and is assigned to the same assignee. As more fully disclosed therein, the inductance control includes a small potentiometer 22 interconnected into the DC saturating current supply to a saturating winding 23 magnetically coupled to the load winding 19 as shown by the dashed coupling line. The position of the potentiometer 22 controls the saturating current level. In accordance with the present invention, a second potentiometer 24 is connected in parallel circuit with potentiometer 22. A set of normally closed contacts 25-1 of a relay 25 are connected in series with the one potentiometer 22 and a set of normally open contacts 25-2 are similarly connected in series with the second potentiometer 24. The relay 25 is connected in a control circuit associated with the dual inputs 10 and 11 as hereinafter described.

The outer end of each phase winding of the secondary 16 is similarly connected to the lead 3 in series with a silicon controlled rectifier 26. The diametrically opposite phase windings of the star connected secondary are connected by simultaneously conducting controlled rectifiers such that pairs of controlled rectifiers 26 are connected to conduct each phase to provide full wave rectification. Each pair of controlled rectifiers 26 is connected to the firing circuit 15a for simultaneous pulsing, with the three pairs being pulsed in proper sequence. Thus, the portion of the half-wave of each winding applied across the leads 3 and 4 is controlled by the phased firing of the related control rectifiers 26.

The paired rectifiers 26 are connected to corresponding firing circuit of unit 15a. One firing circuit 27 is for a related pair of rectifiers 26 is shown in detail. The other two similar firing circuits are similarly constructed and consequently are shown in appropriately labeled blocks. The firing circuit 27 is energized via an input line 28 connected to the output of amplifier 14 as shown in FIG. 1. The signal at line 28 determines the particular time in each half-cycle of the related phase voltage applied to rectifiers 26 to establish a desired constant output voltage having a predetermined slope in accordance with the input unit 10 or 11 and the feedback signals.

In FIG. 2, a pair of windings 29 is coupled to the leads from the phase winding to the anodes of one related pair of rectifiers 26. The windings 29 are connected in parallel with the output leads 30 connected to the current feedback network 10. A current feedback resistor 31 is shown connected across the leads 30. The current feedback network 13 includes a separate slope circuit 32, the output of which is interconnected into the summing amplifier 9.

The illustrated slope circuit 32 includes a full wave bridge diode rectifier 33 connected across the leads 30 and establishing a pulsating direct current related to the current in the leads of rectifiers 26 and thus, in lead 3. The output of the rectifier 33 is filtered by a parallel capacitor 34 to form a filtered direct current signal which is impressed across a potentiometer 35 having a tap 36. The potentiometer 35 further defines a voltage divider for adjusting the feedback signal for difference characteristics of the particular current transformer outputs for any given input such that proper maximum slope can be achieved. The tap 36 of the potentiometer and the common end of the potentiometer 35 are connected across a further voltage dividing network consisting of a pair of series connected resistors 37. The common junction of the resistors 37 is connected to a line 38 which defines a common return or ground line for the control circuit. For purposes of simplicity of illustration, the several ground connections are shown by a conventional ground symbol. In an actual construction, the several grounds terminals are interconnected by suitable conductor or conductors.

A current pickoff circuit is connected in parallel with the voltage dividing resistors 37 and includes a first potentiometer 39 in series with a diode 40. The tap 41 of the potentiometer 39 thus provides a DC signal proportional to the current feedback signal. The potentiometer is connected via a set of normally closed contacts 25-3 of the dual control relay 25 to a feedback current line 43 to provide a current feedback signal to the amplifier 12 as hereinafter described.

The combination of the adjustable potentiometer 39 in parallel with the voltage dividing network of resistor 37 permits both negative and positive feedback with respect to the common ground line 38 as more fully developed in applicants' first identified application.

Applicants have found that the illustrated slope adjustment circuit, particularly in combination with the current feedback amplifier 12 produces a true adjustment of the output characteristic between a positive slope, a zero slope, and a negative slope characteristic and thus, permits application of the supply system to widely varied types of direct current arc welding.

In the illustrated embodiment of the invention, a pair of slope control adjustments are provided and selectively connected into circuit by additional contacts of relay 25. The illustrated potentiometer 39 is normally connected in circuit through the normally closed contact 25-3 and a second potentiometer 42 is connected in parallel with the circuit of potentiometer 39 and selectively connected into the circuit of lead 43 via a set of normally open contacts 25-4.

Either potentiometer 39 or 42 produces a similar modified current feedback signal at the lead 43 which in turn is interconnected to the summing amplifier 12 as follows.

The illustrated current feedback summing amplifier 12 includes a full wave bridge rectifier 44 connected to one phase of the incoming power lines via a suitable transformer 45 to provide a DC bias supply. The output of the rectifier 44 is filtered by a suitable resistor-capacitor network 46 including a pair of series connected Zener diodes 47 connected directly across the filtered circuit. The junction of the Zener diodes 47 is grounded to define the common return line for the system. The network 46 and Zener diodes provide a regulated positive voltage, for example 18 volts at the upper line 48, suitable for operating of the amplifier. The amplifier proper is a differential transistor amplifier including a pair of NPN transistors 49 and 50 parallel connected across the Zener diodes 47, in a well-known differential amplifying circuit. A voltage dividing network including a potentiometer 51 in series with a dropping resistor 52 is connected across the Zener diodes 47. The slider or tap 53 of potentiometer 51 is connected in series with the resistor 54 to the base 55 of transistor 49 producing a bias circuit tending to turn on the transistor 49 and establish an output signal at its collector. The opposite or second transistor 50 of the differential amplifier is connected to be energized from a summing resistor or potentiometer 56, the one side of which is connected via resistor 57 to the current feedback line 43. The opposite side of the summing resistor 56 is connected via a lead 58 to a remote voltage receptacle 59 in series with a set of normally closed contacts 25-5 of the control relay 25.

For the dual control system heretofore discussed, a pair of receptacles 59 and 59' are provided for selectively connecting into the circuit different voltage controls by selective energization of the relay 25. Thus, unit 59 is normally in circuit. Energization of relay 25 opens contacts 25-5 and closes a set of normally open contacts 25-6 associated with the corresponding terminal of the receptacle 59'. Receptacles 59 and 59' are known devices and the circuit with the local voltage control is described. The internal receptacle connections are shown by dotted line connections within the receptacle 59. The lead 58 is connected to a lead 60 by the receptacle 59. The lead 60 is in turn connected to a potentiometer slider or tap 61 of an input voltage adjustment potentiometer 62 defining the input control 10 of FIG. 1. The potentiometer 62 has a one side connected in series with a diode 63 and a common dropping resistor 64 to the positive side or line 48 of the regulated voltage output of the rectifier 44. The opposite side of potentiometer 62 is connected through the receptacle 59 to the common ground.

In the operation of the system, the potentiometer 51 is set to establish a predetermined bias on the transistor 49. The potentiometer 62 of input 10, which is connected in circuit by relay 25 is set to establish a predetermined voltage, related to a desired output voltage, to the one side of the summing resistor 56. The voltage on the other side is determined by the current feedback circuit and particularly the voltage of line 43. A potentiometer tap 65 of the potentiometer 56 connects the voltage through a limiting resistor 66 to the base of the transistor 50. Thus, the voltage applied to the transistor 50 is proportional to the summation of the reference or preset voltage established by potentiometer 62 less the voltage appearing at line 43. The output of the differential amplifier 12 which appears at a lead 67 connected to the collector of transistor 49 is therefore, directly proportional to the summation of the reference input voltage of the input 10 and the current feedback voltage from the current feedback 13.

If relay 25 is energized, the potentiometer 62 is removed and an alternate paralleled potentiometer 67a of the alternate input is similarly connected into circuit through the receptacle 59' and the normally open contacts 25–6. The potentiometer 67a is connected in a parallel circuit with potentiometer 62 and corresponding elements are otherwise identified by similar primed numbers.

In either connection, a current feedback modified signal appearing at line 67 is applied to the voltage feedback network and particularly, amplifier 14.

The voltage feedback system generally is similar to that of the current feedback system and includes the differential transistor amplifier including a pair of transistors connected to a regulated DC supply including a full wave bridge diode rectifier 68 connected across the output of transformer 45 and a regulating network 69. A voltage dividing potentiometer 70 is similarly connected to one transistor 71 of the differential amplifier and biases transistor 71 to conduct. The opposite transistor 72 of the differential amplifier is connected in a bias network to a summing resistor 73, the one side of which is connected to the current feedback line 67 and the opposite side of which is connected via a resistor 74 to the voltage feedback line 13. The output of the differential amplifier is taken off the collector of the transistor 71 via a line 75 which is connected in common to the input lines 28 for the several firing circuits 27.

The illustrated firing circuits employ a unijunction pulsing circuit 76 having a full wave bridge rectifier 77 connected to a corresponding phase through a phase winding 78 which is wound on a corresponding phase of the primary 17 of transformer 1 similar to the system shown in the Buchanan, U.S. Pat. No. 3,337,769. The output of the rectifier 77 is not filtered and provides an in-phase charging current to the unijunction pulsing circuit 76 which includes a two stage amplifier including transistor 79 connected to control the charging of a firing capacitor 80 in the circuit of a unijunction transistor 81 generally similar to that shown in the Buchanan, U.S. Pat. No. 3,337,769. The input transistor 79 is connected to line 28 via a series connected diode and resistor 82. The output of the unijunction circuit 76 is illustrated embodiment of the invention however, controls the discharging of a capacitor 83 which is connected in series with a resistor 84 directly across the output of the rectifier 26. A silicon controlled rectifier 85 in series with a resistor 86 is connected across the capacitor 83. The output of the unijunction transistor 81 is connected via a signal line 87 to the gate of the controlled rectifier 85. Thus, between the firing periods of the unijunction transistor 81, the capacitor 83 is charged from the rectifier 77. The firing of unijunction transistor 81 fires the controlled rectifier 85 which conducts and discharges capacitor 83, thereby generating a corresponding voltage across the resistor 86. A pair of resistors 88 and 89 are connected in common at one end to the junction of the controlled rectifier 85 and the resistor 86 with the opposite ends connected respectively to the gates of the two controlled rectifiers 26 in the main rectifying unit 2. The cascaded power amplifying circuitry as shown is more fully disclosed in applicants' copending application, Ser. No. 819,175, entitled "Controlled Rectifier Arc Welding Supply Having Improved Positive Firing Characteristics" which was filed on the same day as the present application and is assigned to a common assignee.

The control relay 25 is connected to the power through a torch selection circuit 90 actuated by the first torch 6 and alternatively, a second torch selection circuit 91 actuated by the second torch 7.

Referring particularly to FIG. 2, the selection circuit 90 associated with the first torch 6 includes a releasable plug-in type connection 92 which interconnects a set of signal and power lines 93 to a set of contacts 94–1 of a torch selection relay 94 provided in a wire feeder 95 related to the torch 6. The torch selection relay 94 is connected to a power transformer 95a in series with a torch switch 96 and when energized closes contacts 94–1 to supply control power via the cable or lines 93 to the circuit of the control relay 25. The contacts 94–1 are shown connected to transformer 95a in series with the circuit 90. The selection relay 94 is interconnected and coupled to be actuated simultaneously with, and as a result of the operation of a torch power switch, not shown.

When the switch 96 is closed, power is supplied via the releasable connector 92 across the control relay 25 in series with a set of normally closed contacts 97–1 of an interlock relay 97 forming a part of the second selection circuit 91. This results in the energization of the control relay 25 and a reversing of the associated contacts 25–1 through 25–6 inclusive; with the closing of the normally open contacts 25–2, 25–4 and 25–6 and the opening of the normally closed contacts 25–1, 25–3 and 25–5. This, therefore, removes the three control potentiometers 22, 39 and 62 which controlled the inductance, the slope and the voltage and inserts the paralleled alternate potentiometers 24, 42 and 67a.

An interlock relay 98 is connected in parallel with the control relay 25 in the first selection circuit 90. It, in turn, controls a set of normally closed contacts 98–1 connected in circuit with the interlock relay 97 of the second selection circuit 91.

Thus, the second selection circuit 91 includes a releasable connector 99 similarly interconnected to the wire feeder 100 associated with torch 7 and having the torch selection switch 101 of the second torch 7 similarly controlling the supply of power across the interlock relay 97 in series with a set of normally closed contacts 98–1 of the second interlock relay 98. The torch selection switch 101 is coupled to and actuated simultaneously with a main torch power switch, not shown, of torch 7 and thus operates to selectively supply voltage to the circuit 91 and particularly interlock relay 97.

Although not shown, the wire feeders may be provided with further interlocking contacts controlled by the torch switches 96 and 101 and their related relays 94 to connect power to only the one wire feeder at any given time and thereby further insure the desired operation.

Thus, in summary, in the illustrated embodiment of the invention, the operator for a twin wire feeder dual application can independently set the voltage potentiometer 62, the related current feedback potentiometer 39, and the inductance control potentiometer 22 for one welding application. Completely independently, the corresponding potentiometers 67a, 42 and 24 may be adjusted to a different voltage, slope and inductance setting and thus permit an entirely different welding application. In operation, when the torch 6 is operated, as by pulling of the switch trigger, the power switch closes to energize the electrode 8. Simultaneously, the related selection switch 96 is actuated to complete the energizing circuit to the control relay 25 and the associated interlock relay 98. The control relay 25 inserts the related potentiometers into the slope, currents and voltage control circuits and simultaneously the interlock relay 98 opens its contacts 98–1 to positively open the second selection circuit 91 and thereby prevents erroneous insertion thereof.

When the operator terminates the welding application and releases the torch trigger, the switches open and the selection circuits automatically reset to the illustrated standby position.

If the operator now picks up the opposite torch 7 and actuates it, the potentiometer control circuitry remains in the original position as the second torch selection switch 101 does not result in energizing of a control relay means. The actuation of the second torch 7 to energize the torch electrode 9 does actuate the second torch selection switch 101. This applies power to the second interlock relay 97 and maintains it energized during the operating period. The interlock relay 97 opens the normally closed contacts 97-1 to positively prevent the energization of the first selection circuit 90.

RESUME

The present invention thus provides an improved dual control application having means permitting the independent adjustment for different welding applications while positively eliminating the possibility of inserting the wrong settings to a given torch.

We claim:

1. A dual welding control system for selectively welding with a plurality of different arcs, comprising a plurality of separate welding torch means for establishing and maintaining individual welding arcs, an arc power circuit connected to the torch means and having a common adjustable current control element for adjustably supplying an arc establishing power output of a welding voltage and current to the torch means, first adjustable control means for a first of said torch means coupled to said common current control element to adjust said control element of the arc power circuit and thereby said power output, second adjustable control means for a second of said torch means coupled to said common control element to correspondingly adjust said current control element of the arc power circuit and thereby the power output, a control power supply to provide a control voltage, said first and second adjustable control means being connected in parallel with each other to said control power supply, and a first and a second switch means connected one in each of said torch means and connected to said control means to selectively connect the corresponding control means to said control power supply in response to operation of the corresponding torch means.

2. The dual welding control system of claim 1 having a pair of selection circuits each of which includes one of said switch means and interlocking switching means responsive to operation of the corresponding switch means to disable the other selection circuit.

3. The dual welding control of claim 1 having a first selection circuit including a first of said switch means in the first welding torch means and first relay means having contact means connecting the first and second control means to said control power supply, a second selection circuit including a second of said switch means in the second welding torch means and second relay means, said first relay means having disable contact means in said second selection circuit to open said second selection circuit and to said second relay means having disable contact means in said first selection circuit to open said first selection circuit, said torch means having a weld start means and said switch means being connected to and actuated in response to operation of the weld start means of the corresponding welding torch means.

4. A dual welding control system for selectively welding with a plurality of different arcs, comprising a plurality of separate welding torch means each for establishing one of said arcs, an arc power and control circuit connected to the torch means and supplying an arc establishing power output of a welding voltage and current to the torch means, first adjustable control means for a first of said torch means to adjust the arc power control circuit and thereby the power output, a second adjustable control means for a second of said torch means to adjust the arc power control circuit and thereby the power output, a first and a second switch means connected one in each of said torch means and connected to said control means to selectively insert the corresponding control means into said control circuit, the power and control circuit includes current feedback means to control the slope of the welding voltage, a voltage feedback means to control the welding voltage, a variable inductance means connected in series with said torch means, and each of said adjustable control means includes separate adjustable control devices in said current feedback means, said voltage feedback means and said variable inductance means for correspondingly setting of the arc voltage, of the slope, and of the inductance.

5. The dual welding control system of claim 1 having a pair of selection circuits connected in parallel to said control power supply for connecting said adjustable control means to said control power supply, a first releasable connector means connecting a first of said switch means in a first corresponding selection circuit, and a second releasable connector means connecting a second of said switch means in the second corresponding selection circuit, said torch means having a weld start means for completing said arc power circuit and said switch means being actuated in response to operation of the weld start means of the corresponding torch means.

6. The dual welding control system of claim 1 having electrically actuated switching means connecting said control means to said control power supply, said switch means being connected to a source of power within said torch means and to said electrically actuated switching means to supply power to said switching means to selectively connect the control means to the control power supply.

7. The dual welding control system of claim 1 wherein each of said adjustable control means includes a potentiometer, said potentiometers being connected in parallel in said control power supply, first relay mans connected to a first of the switch means and having normally closed contacts in series with the first of said potentiometers across said control power supply and normally open contacts in series with the second of said potentiometers across said control power supply, second relay means connected to the first of the switch means and having normally closed contacts connected in circuit with the second of the switch means, and a third relay means connected to the second of the switch means and having normally closed contacts connected in circuit with the first of the switch means, said torch means having a weld start means to complete said arc power circuit and said switch means being connected to and actuated in response to the operation of the weld start means of the corresponding torch means.

8. A dual welding control system for selectively welding with a plurality of different arcs, comprising a plurality of separate welding torch means each for establishing one of said arcs, an arc power and control circuit connected to the torch means and supplying an arc establishing power output of a welding voltage and current to the torch means, first adjustable control means for a first of said torch means to adjust the arc power control circuit and thereby the power output, a second adjustable control means for a second of said torch means to adjust the arc power control circuit and thereby the power output, a first and a second switch means connected one in each of said torch means and connected to said control means to selectively insert the corresponding control means into said control circuit, wherein each of said torch means includes a manually operated trigger element and coupled to actuate said switch means and including a power switch and simultaneously a selection switch, said selection switch being connected to a control power supply within said torch means, said first and second adjustable control means includes a corresponding first and second potentiometer, said potentiometers being connected in parallel, a first relay connected to the selection switch of one torch to apply power to the relay and having normally closed contacts in series with the first of said potentiometers and normally open contacts in series with the second of said potentiometers, a second relay connected in parallel with the first relay and having normally closed contacts connected in circuit with the selection switch of the second torch means, and a third relay connected to the selection switch of the second torch means to apply power to the third relay and having normally closed contacts connected in common to said first and second relays with the first selection switch.

9. The dual welding control system of claim 8, having releasable connector means for each torch means connecting said selection switches and control power supply to the circuits of said relays.